United States Patent [19]

Evans

[11] Patent Number: 4,729,343
[45] Date of Patent: Mar. 8, 1988

[54] SLEEPING QUARTERS FOR PETS

[76] Inventor: Lydia Evans, 3305 Churchill Dr., Nacogdoches, Tex. 75961

[21] Appl. No.: 944,817

[22] Filed: Dec. 22, 1986

[51] Int. Cl.$^4$ .............................................. A01K 1/02
[52] U.S. Cl. ...................................... 119/19; 119/15
[58] Field of Search .................... 119/19, 15, 1, 29

[56] References Cited

U.S. PATENT DOCUMENTS

| | | | |
|---|---|---|---|
| 1,887,108 | 11/1932 | Steese | 119/19 |
| 2,830,606 | 4/1958 | Daugherty | 119/15 |
| 2,854,948 | 10/1958 | Drayson | 119/1 |
| 3,934,552 | 1/1976 | Kulka | 119/19 |
| 3,982,500 | 9/1976 | Marlatt | 119/19 |
| 4,397,398 | 8/1983 | Watanabe | 119/19 |

*Primary Examiner*—Paul J. Hirsch
*Assistant Examiner*—Vincent Ciamacco
*Attorney, Agent, or Firm*—Thomas L. Cantrell

[57] ABSTRACT

Sleeping quarters for a pet having a flat bottom and arched roof framework with two pen ends and made of lightweight, semi-rigid foam material. A tubular liner having a transversely extending elastic strip sewn to longitudinal gathers is inserted through the open ends of the framework and the ends are folded back onto the framework and held by elastic bands. The interior of the tubular liner of fabric material is resiliently expandable to snugly engage the pet which crawls into the sleeping quarters. An alternate embodiment shows a fully folded portable sleeping quarters structure with two open ends and made of light weight, semi-rigid foam material. This alternate embodiment allows the frame to be expanded to accommodate different sizes of pets. Moreover, a tubular liner having a transversely extending elastic strip sewn to longitudinal gathers is inserted through the open ends of the framework and the ends are folded back onto the framework and held by elastic bands. The interior of the tubular liner of fabric material is resiliently expandable to snugly engage the part which crawls into this portable and expandable sleeping quarters.

21 Claims, 10 Drawing Figures

SLEEPING QUARTERS FOR PETS

BACKGROUND OF THE INVENTION

The invention relates to sleeping quarters for domestic animals, and more particularly, to a combination of an indoor house and bed for dogs or cats including a interior liner to form a cuddly environment for the pets resting inside the sleeping quarters.

HISTORY OF THE PRIOR ART

Man has kept domesticated animals as pets since even before the beginning of recorded history. Dogs and cats have always been the two favorite kinds of pets. There are many reasons that people keep dogs: as companions, work dogs, guard dogs, or a combination of all of these. A prenatal need of every domestic animal is a place to rest. It is particularly important to provide a dog with a suitable bed, preferably a place where he can curl up to rest, to obtain nurture, and to bask in the feeling of security. Although dogs have been domesticated for centuries, their primal instincts of crawling into a cave-like structure to rest have not changed much. Ideally, a dog's sleeping quarters should be "cave-like," to give him a feeling of security and, at the same time, avoid drafts of air. The health of a dog and, in fact, his overall domestic behavior will often depend upon the adequacy of his sleeping quarters.

Another desirable characteristic of sleeping quarters for a dog is that of "snugness" or "cuddliness" which also contribute to the animal's feeling of security and wellbeing. Such cuddliness can be achieved by closely confining the animal's body with soft resilient padding. Conventional sleeping quarters which have tried to provide this feature have been limited by he fact that dogs vary greatly is size and structure providing closeness for a large size dog may be cavernous for a much smaller dog.

Some dogs are kept outdoors requiring an outdoor kennel. This, of course, requires an open area such as a yard or a garden, a luxury often not available for city dwellers. Still, many people prefer to keep their pet dogs indoors, regardless of whether or not a yard or a garden is available. Apartment dwellers, of course, have no alternative but to keep their pets indoors. In close domestic quarters it is desirable for the dog to be able to enter its resting place from more than one direction.

Moreover, many people prefer to take their dog along when they travel. To these people, leaving their dog behind and boarding him while they are away from home is bordering on cruelty to a family member. For long distance travel and particularly when being transported in a traveling kennel by a commercial carrier, a dog will often feel lost and fearful in the totally new environment. It is thus desirable to house the travelling dog in a sleeping quarters that is already familiar to it to minimize the feeling of insecurity.

The desirability of having indoor sleeping quarters for dogs has prompted the development of various types of dog beds. For example, one such bed is shown and described in U.S. Pat. No. 3,989,003 which illustrates a dog bed with a lying-down area arranged inside a housing structure having a bottom surface and walls closing all sides except a section for the entrance for the dog. This dog bed also includes a second resting place, open on all sides and arranged in a vertically spaced relationship to the first resting place. This design, although somewhat effective in providing a dog with two places to rest does not provide the dog with a cuddly and snug cover. Additionally, the dog bed has only one entry way. One embodiment of this invention of dog bed does have a cover that drapes over the dog resting inside. However, this bed has an opening that is controlled by a cumbersome yoke bent in the form of a gate or arc. Moreover, the yoke-operated entry way does not necessarily give a cover with a snug fit to the dog resting inside.

Another type of dog bed is shown and described in U.S. Pat. No. 2,854,948. This patent illustrates a sleeping bag for a dog having a substantially rectangular rigid base frame with an arched framework entry way pivotally connected to the base frame. A pair of collapsible braces is used to maintain the arched framework over with fabric covering. A V-shaped cutout in the fabric across the arched framework provides an access opening for admitting the pet to the interior of the bed. Again, this type of dog bed has only one entry way and does not provide the desirable cuddly and snug fit along its entire length.

Another dog bed is shown in U.S. Pat. No. Des. 232,850 which illustrates a rectangular sleeping bag with a semicircular frame erected in a vertical position at the mouth thereof to hold it open. The semicircular frame is provided with a downwardly extending curtain to serve as a closure. Like other types of prior art dog beds described above, this dog bed has no provision for a cuddly and snug fit regardless of the size of the dog. Moreover, there is only one entry way restricting the locations at which it can be used inside a home.

The present invention overcomes many of the disadvantages of prior art domestic animal houses and beds by adapting a light weight outer frame with a specially design interior lining that is soft, cuddly and resiliently expandable. It is specially contoured and structured to give the pet a snug and cuddly fit while the pet is resting or sleeping inside despite variations in sizes on animals. Moreover, the lining is readily removable and washable and the structure has a double entry located at opposite ends. The present sleeping quarters is low cost, portable and can be easily carried into an automobile and can even be fitted into a travelling kennel or crate.

SUMMARY OF THE INVENTION

The invention relates to a sleeping quarters structure for domestic animals which includes an elongated hollow frame open at least one end to allow entrance by an animal. The structure includes a tubular fabric liner for the interior of this hollow frame having an elongated body portion and at least one open end. The diameter of the liner is greater than that of the open end of the frame to allow the end thereby to be folded back onto the outside of the frame and provide an opening in the liner for entry by the animal. The open end of the liner has a resilient band fixed thereto to grip the outside of said frame when folded back thereon. At least one resilient band is affixed to the outside of the tubular fabric liner and extends transversely to the longitudinal axis thereof. The fabric surface is fixed to the band and arranged into gathers with the troughs of the gathers extending transversely to the bands to bring the surface of the liner adjacent the band toward the opposite side of said liner to reduce the inside diameter of liner and to provide a snug resiliently conforming fabric surface for the animal to nestle against within the hollow frame of the structure.

In another aspect, the invention includes a sleeping quarters structure for domestic animals in which the elongated hollow frame is open at two opposite ends. The tubular liner is also open at both ends and includes resilient bands affixed to each end for allowing both ends to be folded back upon the frame to provide entrances for an animal at each end of the frame.

In a still further aspect, the invention includes a sleeping quarters structure for domestic animals in which the tubular fabric liner includes a plurality of parallel resilient bands affixed to the outside of the liner and spaced parallel to one another across the longitudinal axis of said tubular liner to reduce the diameter of the liner along its axis and provide a snug resiliently conforming surface for an animal, extending substantially the length of the hollow frame.

A further aspect of the invention includes a sleeping quarters structure for domestic animals in which an outer housing consists of an elongate strip of flexible material foldable upon itself across its transverse direction into collapsed configuration and having means affixed at opposite ends and at opposite sides thereof for releasable joining of the ends and the strip being arrangeable in an expandable tubular configuration. The structure includes also a tubular fabric liner for the interior of the outer frame having an elongated body portion and openings at both ends, the diameter of the liner is greater than that of the open end of the frame held in extended tubular configuration at its maximum size. The liner is folded back onto the outside of the frame to provide an opening in the liner for entry by the animal. The opening of the liner has a resilient band fixed thereto to grip the outside of the frame when folded back thereon. At least one resilient band is affixed to the outside of the tubular fabric liner and extending transversely to the bands to ring the surface of the liner adjacent the band toward the opposite side of the liner to reduce the diameter of the liner and to provide a snug, resiliently conforming fabric surface for the animal to nestle against within the enclosure of the structure. A still further aspect of the invention includes a sleeping quarters structure for domestic animals in which the tubular fabric liner has a plurality of parallel resilient bands affixed to the outside of the liner and placed parallel to one another across the longitudinal axis of the tubular liner to reduce the diameter of the liner along its axis and provide a resiliently conforming surface for an animal, extending substantially the length of the enclosure.

BRIEF DESCRIPTION OF THE DRAWINGS

For a more complete understanding of the present invention and for further objects and advantages, thereof, reference may now be had to the following description taken in conjunction with the accompanying drawing in which.

DESCRIPTION OF THE PREFERRED EMBODIMENT

Figure 1:
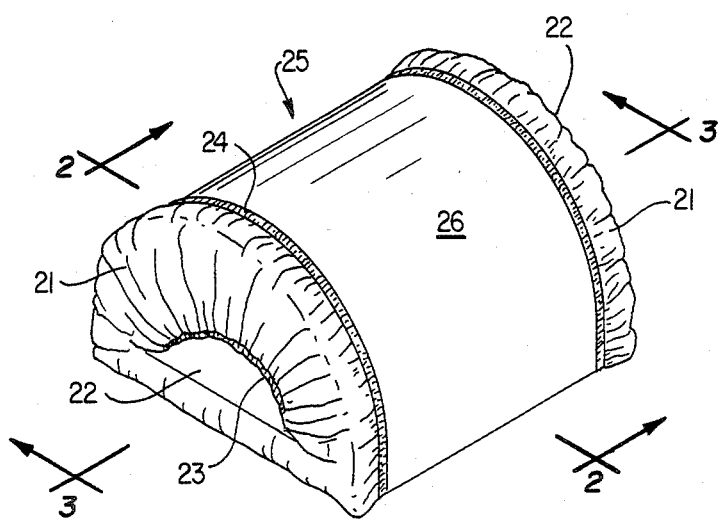
FIG. 1 is a perspective view of one embodiment of the sleeping quarters of the present invention having an elongated semi-cylindrical configuration and showing one of the two entry ways.

Referring now to FIG. 1 there is shown a perspective view of one embodiment of the present invention of the indoor sleeping quarters for pets. The overall shape of the structure is one of an elongated arch-like semi-cylinder, with a flat bottom portion and with the semi-cylindrical arch forming the roof and the surrounding wall sections of the quarters. Two entry ways are located longitudinally opposite to each other at two ends of the semi-cylindrical outer frame 25. The outer surface of frame 25 is covered with a decorative and protective layer 26. The inside of the quarter is fitted with a tubular lining 21 formed of a light-weight, warm and washable fabric which has two semi-oval entrance openings 22 located at opposite ends. The fabric can have a fuzzy surface or can be of flannel-like material. The diameter of the tubular lining 21 is greater than that of the outer frame 25. The two open ends of the tubular lining 21 are each provided with an elastic band 24 which enables the ends to be folded back upon the outside of the framework to form openings 22 for entrance by an animal. As is more fully described below, the tubular liner includes a plurality of parallelly transversely extending elastic bands two of which are located at opposite ends in alignment with the open ends of the framework. The bands are joined to the outside of the fabric tube and hold the fabric material in gathers, to make the entrance opening stretchable and in semi-oval form. The tubular interior lining 21 is slipped inside the outer frame 25 and secured onto the outer frame by turning the two ends of the interior lining 21 inside out over the two longitudinally opposite openings of the outer frame 25. It is held in place by the sewn-in elastic bands 24.

The pet enters the quarters through one of the two stretchable openings 22. The pet can crawl all the way to the other end of the sleeping quarters and expose its head or however much front portion of its body to the outside and be partially within and partially without the sleeping quarters. Alternatively, once inside the sleeping quarters, the dog can turn around and expose its head or however much of the front portion of its body to the outside as it desires and again be partially within and partially without the sleeping quarters. Either way, the opening of the interior lining as well as the lining itself will resiliently stretch and snugly fit around the animal regardless of its size. The other poriton of the interior lining 21, provided with one or more strips of elastic bands, arranged in parallel form and holding the lining in gathers, will likewise wrap the body of the pet in a cuddly manner within the sleeping quarters. Of course, it can also crawl fully into the sleeping quarter and be completely covered by the interior lining 21. The pet is thus allowed to help itself to more or less cover and warmth as he desires.

Figure 2:
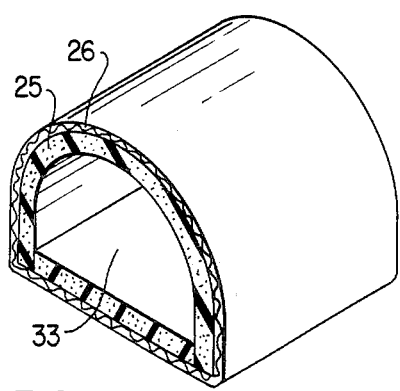
FIG. 2 is a perspective view of the outer frame of the sleeping quarters of the present invention as depicted in FIG. 1 with the specially contoured tubular inner lining removed.

Referring now to FIG. 2, there is shown a perspective view of the outer frame 25 of one embodiment of the sleeping quarters of the present invention of FIG. 1. The outer frame 25 is preferably made from a semi-rigid foam-like material that is not only light-weight but also which also will retain semi-cylindrical shape of the outer frame. Among other materials, the frame can be made of polyurethane. The frame is in the shape of a longitudinal semi-cylinder with a flat bottom and a semi-circular roof extends to the bottom of the structure and forms side walls. The two ends of the outer frame define arched openings. The external surface of the outer frame 25 may be covered with a decorative and protective layer 26.

Figure 3:
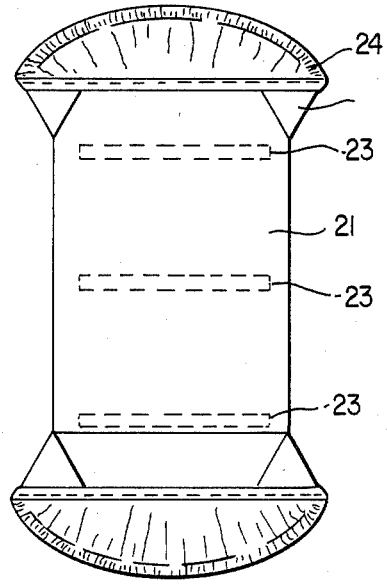
FIG. 3 is a bottom plan view of the tubular interior lining of FIG. 1 that is laid flat, with its gathers fully stretched.

Referring now to FIG. 3, there is shown a bottom plan view of the tubular interior fabric lining of FIG. 1 showing the liner laid flat with its gathers fully stretched. The diameter of the tublular lining 21 is greater than that of the open end of the outer frame 25. Each of the two longitudinal ends of this elongated tubular inner lining 1 has a slightly enlarged radial shoulder 34 to accommodate the turning inside-out of the interior lining so as to fit the outer frame 25. The whole interior lining 21 is secured in place by one or more elastic bands 24 which extend around the entire circumference of the opening and hold the underlying materials in gathers. Distributed along the length of the interior lining 21 are parallel strips of elastic bands 23 which are sewn onto the upper section, and they stretch partially along the shorter axis, or width, of the interior lining 21. When expanded, these elastic bands 23 hold the fabric material in gather form and provide means of holding the two entry ways in a partially opening position. The effect of gathers held together by these parallel elastic bands 23 is to give a resilient expandability to the inner lining enabling it to snugly and cuddly wrap around the pet resting or sleeping inside regardless of the size of the animal.

Figures 4, 5:
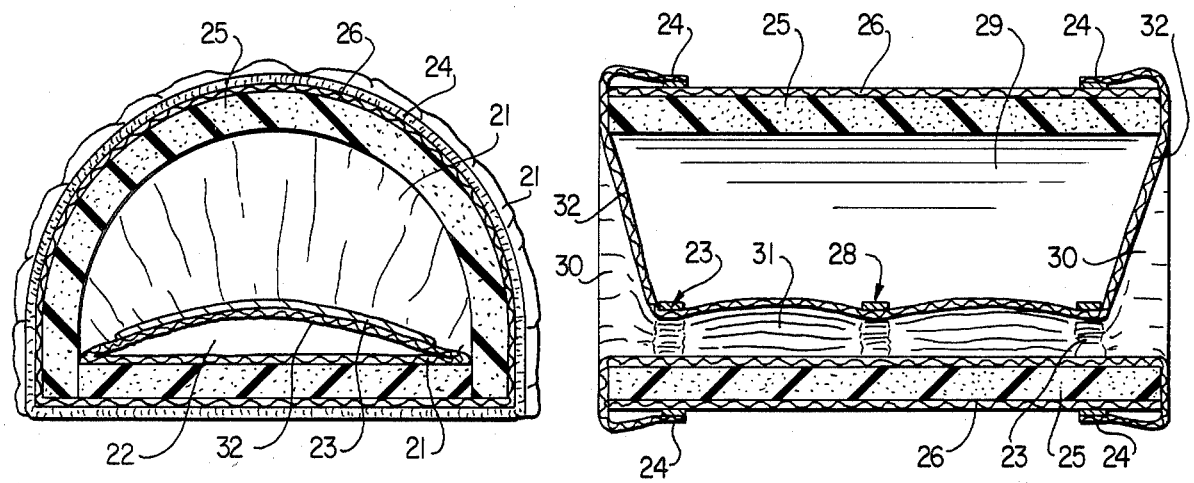
FIG. 4 is a cross-sectional and elevational view taken along the line 2—2 of FIG. 1.
FIG. 5 is a cross-sectional and elevational view taken along the line 3—3 of FIG. 1.

Referring now to FIG. 4, there is shown a cross-sectional view taken along the axis 2—2 of FIG. 1. The tubular interior lining 21 drapes downwardly to form a reduced opening 22 for the animal. The opening 22 is held in shape by one or more elastic bands 23, preferably sewn parallelly to the outside of the inner lining 21. The elastic bands 23 hold the fabric material of the tubular liner, or lining, in gather form enabling the material to be resiliently stretchable. The tubular inner lining 21, with a diameter greater than that of the open end of the outer frame, is turned inside-out along the two openings of the outer frame 25 and held in place by one or more sewn-on elastic bands 24, which also hold the underlying fabric in gather form.

Referring to FIG. 5, there is shown a cross-sectional view taken along the axis 3—3 of FIG. 1. The top and the bottom sections of the outer frame 25 are shown to be covered on the outside with a decorative and protective layer 26. The inner tubular lining 21 drapes downwardly forming an empty air pocket 29 on the upper part of the sleeping quarters with the two entrance openings held in shape by the parallel elastic bands 23, which hold the fabric material in gather form. The center portion of the tubular lining 21 is also provided with one or more sewn-on elastic bands 28, extending parallel to one another and holding the underlying lining in gather form, to give the cuddly snug fit of the said interior lining 21 to the pet resting or sleeping inside. The inwardly tapering surface forms a cone-like entrance way to each end of the sleeping quarters. Space 31, enclosed by the inner lining 21, is where the pet sleeps or rests. The enclosed space 31 is snugly and resiliently expandable by virtue of the gathers held in place by the parallel elastic bands 23 and 28.

Figure 6:
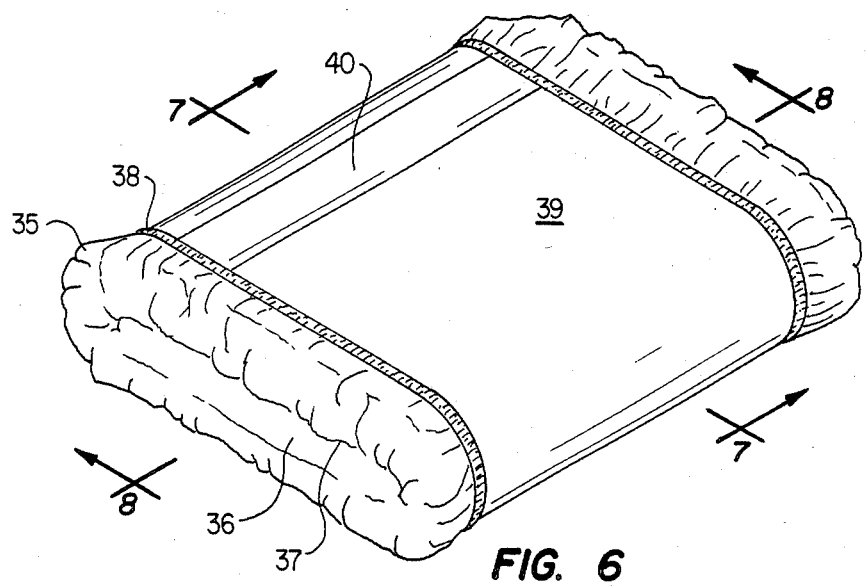
FIG. 6 is a perspective view of another embodiment of the sleeping quarters of the prsent invention having a collapsible and adjustable outer frame showing one of the two entry ways.

Referring to FIG. 6, there is shown a perspective view of another embodiment of the present invention of the portable indoor sleeping quarters for pets shown in a collapsed configuration. The overall shape of the structure is elongated and rectangular with a continuous wall forming the roof and the surrounding wall sections. The sleeping quarter is collapsible and the size of its interior enclosure is adjustable. The two entry ways are longitudinally opposite to one another located at opposed ends of the rectangular outer frame 39 which is covered with a decorative and protective layer 40. The entire interior of the quarters is fitted with a continuous tubular piece of light-weight, warm, washable lining 36 having two entrance openings 36 located at opposite ends. The fabric can have a fuzzy surface or can be of a flannel-like material. The diameter of the interior lining 36 is greater than that of the open end of the outer frame 39 when it is open to this maximum size. The top side of the entry way of the interior lining 35 is provided with one or more transversely extending elastic bands 37, arranged in parallel and holding the fabric material in gathers, to make the entrance opening stretchable and hold the interior lining 35 in place. The tubular interior lining 35 is slipped inside the outer frame 39 and fastened onto the outer frame 39 by turning the two open ends of the interior lining 35 inside out over the two longitudinally opposite openings of the outer frame 39. The ends of the tubular liner are held in place by means of elastic bands 38 which also hold the underlying fabric in gather form.

In operation, the pet enters the quarters through one of the two stretchable openings 36. The pet can crawl all the way to the other end of the sleeping quarters and expose its head or however much of the front portion of its body to the outside as it desires and again to be partially within and partially without the sleeping quarters. Either way, the opening of the cover will stretch and snugly fit around the part of the body enclosed. The other portion of the lining, provided with one or more strips of elastic bands, arranged in parallel form and holding the lining in gathers, will snugly enclose the body of the pet within the sleeoing quarters. Of course, the pet can also crawl fully into the sleeping quarters and be completely covered by the inner lining. The pet is thus allowed to help itself to more or less cover and warmth as he desires. The collapsible nature of this embodiment of the sleeping quarters makes the invention portable, and ideally suited for a pet travelling with is owner. To accommodate larger size dogs, the frame 39 can be expanded from its collapsed configuration shown by moving its ends relative to one another to open the interior to the size desired. The ends may be held in place with respect to one another the Velcro TM fasteners or other fastening device.

Figure 7:
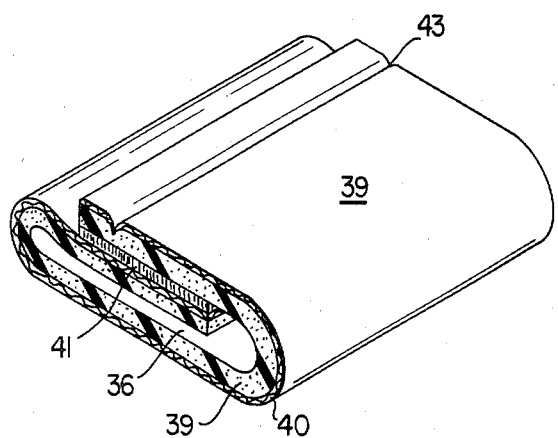
FIG. 7 is a perspective view of the outer frame of the sleeping quarters of the present invention as depicted in FIG. 6 shown with the tubular inner lining removed.

Referring now to FIG. 7, there is shown a perspective view of the outer frame 39 of the embodiment of the present invention depicted in FIG. 6. The outer frame 39 is preferably made from a semi-rigid foam-like material that is not only light weight but will retain its shape in use. One of the materials that can be used for this outer frame is polyurethane. This collapsible embodiment of the invention shows the rectangular outer frame 39 being folded and held in place by Velcro 41. The strip of Velcro that runs near the outer edge and along the entire short axis of the underside of the longitudinal end of the outer cover 40 is sewn onto the outer frame 39. The external surface of the outer frame 39 is further covered with a protective and decorative layer.

Figure 8:
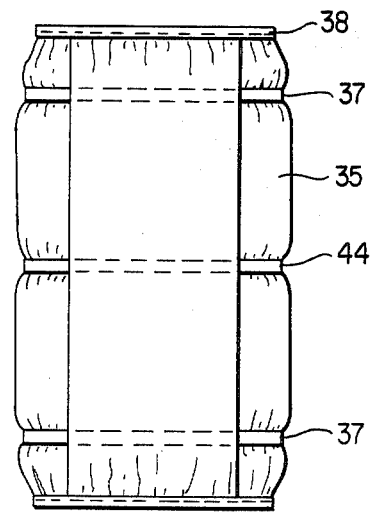
FIG. 8 is a bottom plan view fo the tubular interior lining of sleeping quarters shown in FIG. 6 with its gathers fully stretched.

Referring now to FIG. 8, there is shown on a bottom plan view of the interior lining of FIG. 6 laid flat on its side with the gathers fully stretched. The diameter of the interior lining 35 is greater than that of the openings of the outer frame held in expanded form at its maximum size. Each of the two longitudinal ends of the elongated tubular inner lining 35 is tapered slightly inwardly to accommodate the turning inside-out of the lining so as to fit the outer frame 39. The lining is thereby secured in place on the frame by one or more elastic bands 38 that run around the entire circumference of the opening and hold the underlying material in gathers. Also, in the center portion of the interior lining are a plurality of parallel elastic bands 37, parallel to one another, which are sewn to the upper section and which stretch in a direction transverse to the longitudinal axis of the interior lining 35. The elastic bands hold the fabric material in gather form and provide a means for holding the two entry ways in a partially open position. The center portion of the tubular lining is provided on its upper portion with one or more parallel elastic bands 44 also stretching in a direction transverse to the longitudinal of the interior lining 35. The resulting effect of the fabric gathers held together by these parallel elastic bands 37 and 44 is to give elastic resilience to the inside surface of the inner lining 35 enabling the lining to snugly conform round the pet resting or sleeping inside.

Figure 9:
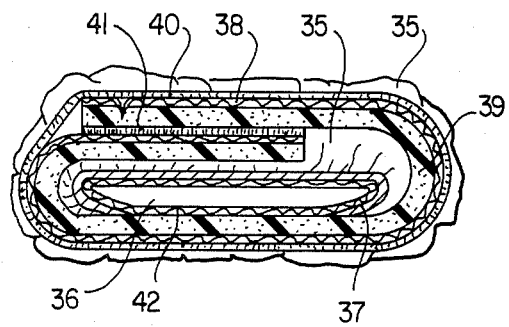
FIG. 9 is a cross-sectional and elevational view taken along the line 7—7 of FIG. 6.

Referring to FIG. 9, there is shown a detailed view of the entry way of the structure in a collapsed configuration viewed in cross-section along the line 7—7 of FIG. 6. The interior lining 35 drapes downwardly. The opening of the entry way 36 is held in shape by one or more elastic bands 37, preferably sewn parallel to one another onto the outside of the inner lining 35. The elastic bands 37 hold the fabric material of the lining 35 in gather form enabling the material to be resiliently stretchable. The outer frame 39 is covered with a decorative and protective layer 40. The two longitudinal ends of the outer frame 39 are provided with Velcro hooks and pile fastening material 41, one or more strips of the Velcro running near the outer edge along the entire short axis on the underside of the outer frame and two or more short strips of the Velcro running along part of the long axis of the upperside of the said outer frame. The collapsed rectangular outer frame 39 can be unfolded and opened and then reclosed to form an enclosure for larger sizes of dogs. The tubular inner lining 35, with a diameter greater than that of the open end of the outer frame is then held open to its maximum size. The ends of the liner are turned inside-out along the two openings of the outer frame 39 and held in place by one or more sewn-on elastic bands 38 which also hold the underlying fabric in gather form.

Figure 10:
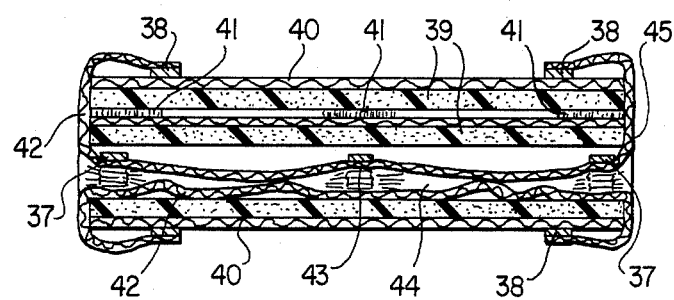
FIG. 10 is a cross-sectional and elevational view taken along the line 8—8 of FIG. 6.

Referring to FIG. 10, there is shown the cross-sectional view taken along the line 8—8 of FIG. 6. The top and the bottom portions of the outer frame 39 are shown to be covered on the outside with a decorative and protective layer 40. The inner tubular liner 35 drapes downwardly forming an empty air pocket 45 on the upper part of the sleeping quarters with the two entrance openings held in shape by one or more parallel elastic bands 37 holding the fabric material in gather form. The center portion of the tubular lining 35 is further provided with elastic bands 43, also parallel to one another and holding the underlying material in gather form. The elastic bands and gathered fabric give the cuddly and snug fit of the interior lining 35 to the pet resting or sleeping inside. Space 4, enclosed by the inner lining 35, is where the pet rests or sleeps. The enclosed space 44 is expandable by virtue of the elastic bands and fabric gathers. It should be noted that for clarity and simplicity, FIGS. 6, 7, 9 and 10 are shown with the lap joint at the top. It is also suitable, however, to have a lap joint on the bottom of the sleeping quarters so that the weight of the animal resting inside will make the outer frame more difficult to unfold, accidentally.

It is believed that the operation and construction of the above-described invention will be apparent from the foregoing description. While the indoor sleeping quarters for pets shown and described have been characterized as being preferred, it will be obvious that various changes and modifications may be made without departing from the spirit and scope of the invention as defined in the following claims.

What I claim is:

1. A sleeping quarters structure for domestic animals comprising:
   an elongated hollow frame open at at least one end to allow entrance by an animal;
   a tubular fabric liner for the interior of said hollow frame having an elongated body portion and at least one open end, the diameter of said liner being greater than that of the open end of said frame to allow the end thereby to be folded back onto the outside of said frame and to provide an opening in said liner for entry by said animal, the open end of said liner having a resilient band fixed thereto to grip the outside of said frame when folded back thereon; and
   at least one resilient band affixed to the outside of said tubular fabric liner and extending transversely to the longitudinal axis thereof, the fabric surface fixed to said band being arranged into gathers with the troughs of said gathers extending transversely to said band to bring the surface of said liner adjacent said band toward the opposite side of said liner, locally reducing the inside diameter of the liner and providing snug resiliently conforming fabric surface for the animal to nestle against within the hollow frame of said structure.

2. A sleeping quarters structure for domestic animals as set forth in claim 1 wherein said elongated hollow frame is open at two opposite ends; and wherein;
   said tubular liner is also open at both ends and includes resilient bands affixed to each end for allowing both ends to be folded back upon said frame to provide entrances for an animal at each end of said frame.

3. A sleeping quarters structure for domestic animals as set forth in claim 2 wherein,
   said tubular fabric liner includes a plurality of parallel resilient bands affixed to the outside of said liner and spaced parallel to one another across the longitudinal axis of said tubular liner to reduce the diameter of the liner along its axis and to provide a snug resiliently conforming surface for an animal, extending substantially the length of the hollow frame.

4. A sleeping quarters structure for domestic animals as set forth in claim 2 wherein said tubular fabric liner is formed of a fabric having a fuzzy interior surface forming the interior of said liner.

5. A sleeping quarters structure for domestic animals as set forth in claim 2 wherein said tubular fabric liner is formed of a fabric of flannel-like material.

6. A sleeping quarters structure for domestic animals as set forth in claim 1 where by the hollow frame is in the form of a flexible elastomeric foam material.

7. A sleeping quarters structure for domestic animals as set forth in claim 1 whereby the hollow frame is formed of sheet polyurethane foam.

8. A sleeping quarters structure for domestic animals as set forth in claim 1 wherein said hollow frame has a flat bottom surface and a continuously curving arched roof and side-wall.

9. A sleeping quarters structure for domestic animals as set forth in claim 1 wherein the exterior surface of said hollow frame is provided with a protective cover.

10. A sleeping quarters structure for domestic animals comprising:
   an elongated outer frame open at at least one end to allow entrance by an animal;
   a tubular fabric liner for the interior of said hollow frame having an elongated body portion and at least one open end, the diameter of said liner being greater than that of the open end of said frame to allow the end thereby to be folded back onto the outside of said frame and to provide an opening in said liner for entry by said animal, the open end of said liner having a resilient band fixed thereto to grip the outside of said frame when folded back thereon; and
   at least one resilient band affixed to the outside of said tubular fabric liner and extending transversely to the longitudinal axis thereof, the fabric surface fixed to said band being arranged into gathers with the troughs of said gathers extending transversely to said band to bring the surface of said liner adjacent said band toward the opposite side of said liner, locally reducing the inside diameter of the liner and providing a snug resiliently conforming fabric surface for the animal to nestle against within the hollow frame of said structure.

11. A sleeping quarters structure for domestic animals as set forth in claim 10 wherein said elongated outer frame is open at two opposite ends; and wherein, said outer frame has a flat bottom surface and a continuously curving arched roof and side-wall.

12. A sleeping quarters structure for domestic animals as set forth in claim 10 where said elongated outer frame is open at two opposite ends; and wherein said outer frame includes an elongate strip of flexible material foldable upon itself across its transverse direction into a collapsed configuration and having means affixed at opposite ends and at opposite sides thereof for releasably joining said ends and said strip being arrangeable in an expandable tubular configuration.

13. A sleeping quarters structure for domestic animals comprising:
   an outer frame includes an elongated strip of flexible material foldable upon itself across its transverse direction into a collapsed configuration and having means affixed at opposite ends and at opposite sides thereof for releasably joining said ends and said strip being arrangeable in an expandable tubular configuration;
   a tubular fabric liner for the interior of said outer frame having an elongated body portion and openings at both ends, the diameter of said liner being greater than that of the open end of the said frame held in extended tubular configuration at its maximum size, said liner being folded back onto the outside of said frame to provide an opening in said liner for entry by said animal, the opening of the said liner having a resilient band fixed thereof to grip the outside of said frame when folded back thereon; and
   at least one resilient band affixed to the outside of said tubular fabric liner and extending transversely to the longitudinal axis thereon, the fabric surface fixed to said bands being arranged into gathers with the troughs of said gathers extending transversely to said band to bring the surface of said liner adjacent said band toward the opposite side of said liner, locally reducing the diameter of the surface for the animal to nestle against within the enclosure of said structure.

14. A sleeping quarters structure for domestic animals as set forth in claim 13 wherein said outer frame is open at two opposite ends; and wherein,
   said tubular liner is also open at both ends and includes resilient bands affixed to each end for allowing both ends to be folded back upon said frame to provide entrances for an animal at each end of said frame.

15. A sleeping quarters structure for domestic animals as set forth in claim 14 wherein said tubular fabric liner includes a plurality of parallel resilient bands affixed to the outside of said liner and spaced parallel to one another across the longitudinal axis of said tubular liner to locally reduce the diameter of said liner along its axis and provide a resiliently conforming surface for an animal, extending substantially the length of the frame.

16. A sleeping quarters structure for domestic animals as set forth in claim 14, wherein said tubular fabric liner is formed of a fabric having a fuzzy surface forming the interior of said liner.

17. A sleeping quarters structure for domestic animals as set forth in claim 14 wherein, said tubular fabric liner is formed of a fabric of flannel-like material.

18. A sleeping quarters structure for domestic animals as set forth in claim 13 wherein the two longitudinal ends of the outer frame are provided respectively with mating parts of hook and pile fastening materials, one or more strips of said fastening material running near the outer edge of one side of one end of the outer frame and two or more short strips of the mating tyoe of fastening material running along the opposite side and opposite end of the outer frame to allow mating engagement between the fastening material when the opposite ends of the frame are folded upon each other.

19. A sleeping quarters structure for domestic animals as set forth in claim 13 whereby the tubular strip is in the form of a flexible elastomeric foam material.

20. A sleeping quarters structure for domestic animals as set forth in claim 13 whereby the tubular strip is formed of a sheet of polyurethane foam.

21. A sleeping quarters structure for domestic animals as set forth in claim 13 wherein the exterior surface of said tubular strip is covered with a protective layer.

* * * * *